(12) United States Patent
Kuroda et al.

(10) Patent No.: US 9,783,087 B2
(45) Date of Patent: Oct. 10, 2017

(54) SEAT STRUCTURE OF VEHICLE

(71) Applicant: MAZDA MOTOR CORPORATION, Hiroshima (JP)

(72) Inventors: Koji Kuroda, Hiroshima (JP); Junsuke Inoue, Hatsukaichi (JP); Ryo Sawai, Hatsukaichi (JP); Tomoyuki Abe, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 93 days.

(21) Appl. No.: 14/793,179

(22) Filed: Jul. 7, 2015

(65) Prior Publication Data

US 2016/0009207 A1 Jan. 14, 2016

(30) Foreign Application Priority Data

Jul. 8, 2014 (JP) .................................. 2014-140277

(51) Int. Cl.
*B60N 2/42* (2006.01)
*B60N 2/56* (2006.01)
*B60N 2/48* (2006.01)
*B60N 2/427* (2006.01)

(52) U.S. Cl.
CPC ............ *B60N 2/48* (2013.01); *B60N 2/4228* (2013.01); *B60N 2/42727* (2013.01); *B60N 2/5635* (2013.01)

(58) Field of Classification Search
CPC .... B60N 2/5635; B60N 2/5642; B60N 2/565; B60N 2/5657; B60N 2/4228; B60N 2/4221
See application file for complete search history.

(56) References Cited

U.S. PATENT DOCUMENTS

| 2008/0122275 | A1* | 5/2008 | Flory | B60N 2/5671 297/230.1 |
| 2009/0121525 | A1* | 5/2009 | Nishide | B60N 2/5657 297/180.13 |
| 2009/0134677 | A1* | 5/2009 | Maly | B60N 2/5657 297/180.14 |
| 2009/0295200 | A1* | 12/2009 | Ito | B60N 2/4808 297/180.14 |
| 2010/0209230 | A1* | 8/2010 | Eckel | B60H 1/00285 415/119 |
| 2012/0144844 | A1* | 6/2012 | Park | B60N 2/5692 62/3.3 |

(Continued)

FOREIGN PATENT DOCUMENTS

JP 2011-104246 A 6/2011

*Primary Examiner* — Timothy J Brindley
(74) *Attorney, Agent, or Firm* — Studebaker & Brackett PC

(57) ABSTRACT

A headrest which supports a head portion of a passenger in a vehicle rear collision is attached to an upper portion of a frame of a seatback. A blower to perform ventilation for a passenger's back is arranged at the upper portion of the frame at a position below the headrest. The blower is held at the frame via attaching members, for example. When receiving a large rearward-load from the passenger in the vehicle rear collision, the blower moves rearward relatively to the frame and the headrest according to a rearward move (a rearward swing around an upper frame, particularly) of the attaching member and the like.

3 Claims, 6 Drawing Sheets

(56) References Cited

U.S. PATENT DOCUMENTS

| | | | | |
|---|---|---|---|---|
| 2012/0256451 A1* | 10/2012 | Sahashi | ............ | B60N 2/5635 |
| | | | | 297/180.14 |
| 2013/0300179 A1* | 11/2013 | Ota | ............ | B60N 2/5664 |
| | | | | 297/452.42 |
| 2014/0265494 A1* | 9/2014 | Abe | ............ | B60N 2/7094 |
| | | | | 297/296 |
| 2015/0306999 A1* | 10/2015 | Awatani | ............ | B60N 2/5635 |
| | | | | 297/180.14 |
| 2015/0329029 A1* | 11/2015 | Akaike | ............ | B60N 2/5657 |
| | | | | 297/180.14 |
| 2016/0009207 A1* | 1/2016 | Kuroda | ............ | B60N 2/4228 |
| | | | | 297/180.14 |

* cited by examiner

SEAT STRUCTURE OF VEHICLE

BACKGROUND OF THE INVENTION

The present invention relates to a seat structure of a vehicle.

In vehicles, a headrest is attached to an upper portion of a seatback such that a head portion of a passenger is supported at the headrest in a vehicle rear collision (for whiplash prevention).

Meanwhile, there is a tendency that many vehicles have recently adopted a structure in which a vent portion is formed at a back face of the seatback such that ventilation is performed through this vent portion by means of a blower provided inside the seatback, as shown in Japanese Patent Laid-Open Publication No. 2011-104246, aiming at improvement of comfortability of the passenger.

It is desired for an ideal passenger's protection that a back of the passenger moves rearward relatively to a seat in the vehicle rear collision (a longitudinal-relative position between the head portion and the back of the passenger is prevented from becoming greatly). Meanwhile, since the above-described blower for the ventilation is arranged at a position below the headrest and made from rather hard material, this blower may become a cause of preventing the back of the passenger from moving rearward in the vehicle rear collision.

SUMMARY OF THE INVENTION

The present invention has been devised in view of the above-described matter, and an object of the present invention is to provide a seat structure of a vehicle in which the blower does not prevent the back of the passenger from moving rearward in the vehicle rear collision.

The present invention is a seat structure of a vehicle provided with a seatback, to an upper portion of which a headrest is attached and a back face of which has a vent portion, wherein a blower to perform ventilation through the vent portion is arranged at an upper portion of the seatback at a position below the headrest, and the blower is configured to be movable rearward relatively to a frame of the seatback and the headrest when receiving a large rearward-load from a passenger seated in the seat in a vehicle rear collision. According to the present invention, when the back of the passenger moves rearward in the vehicle rear collision, the blower also moves rearward, so that the back of the passenger can move rearward sufficiently. Thereby, the passenger's protection can be performed properly, supporting the passenger's head portion at the headrest.

In an embodiment of the present invention, the frame of the seatback comprises an upper frame which extends in a width direction of the vehicle and to which the headrest is attached, and the blower is supported at the upper frame such that a rearward-move amount (i.e., rearward displacement) of a lower portion of the blower is greater than that of an upper portion of the blower when receiving the large rearward-load from the passenger in the vehicle rear collision. According to this embodiment, the lower portion of the blower which is positioned further away from the upper frame to which the headrest is fixed moves rearward more, so that the blower can surely move corresponding to the move of the passenger's back, which is preferable in supporting the passenger's head portion at the headrest surely.

In another embodiment of the present invention, the blower is supported at the upper frame so as to swing rearward around the upper frame. According to this embodiment, the effect of the above-described embodiment can be obtained easily by using a swinging operation.

In another embodiment of the present invention, there is provided an attaching member, an upper end portion of which is rotatably attached to the upper frame and which comprises a downward extension portion extending downward from the upper frame, and the blower is attached to the downward extension portion. According to this embodiment, the effect of the above-described embodiment can be obtained easily and surely by using the attaching member.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Figure 1:
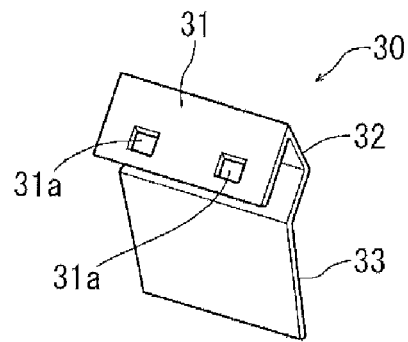
FIG. 1 is an exploded perspective view showing an embodiment of the present invention.
Figure 1:
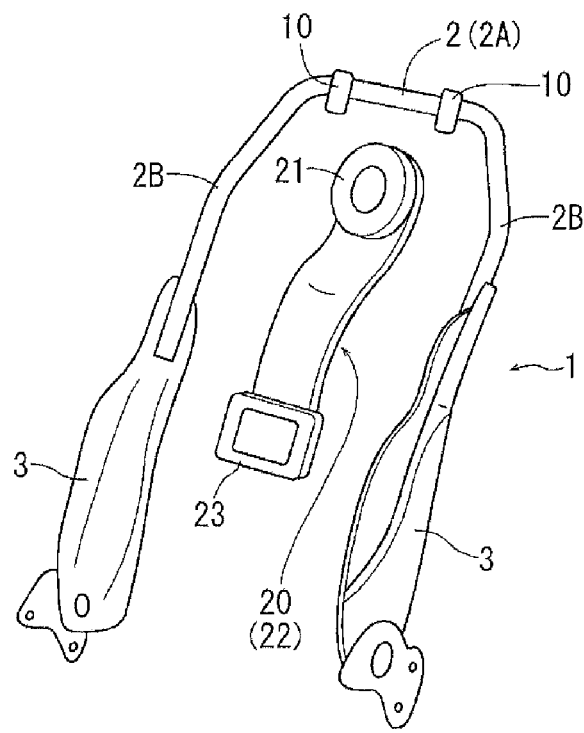
Figure 2:
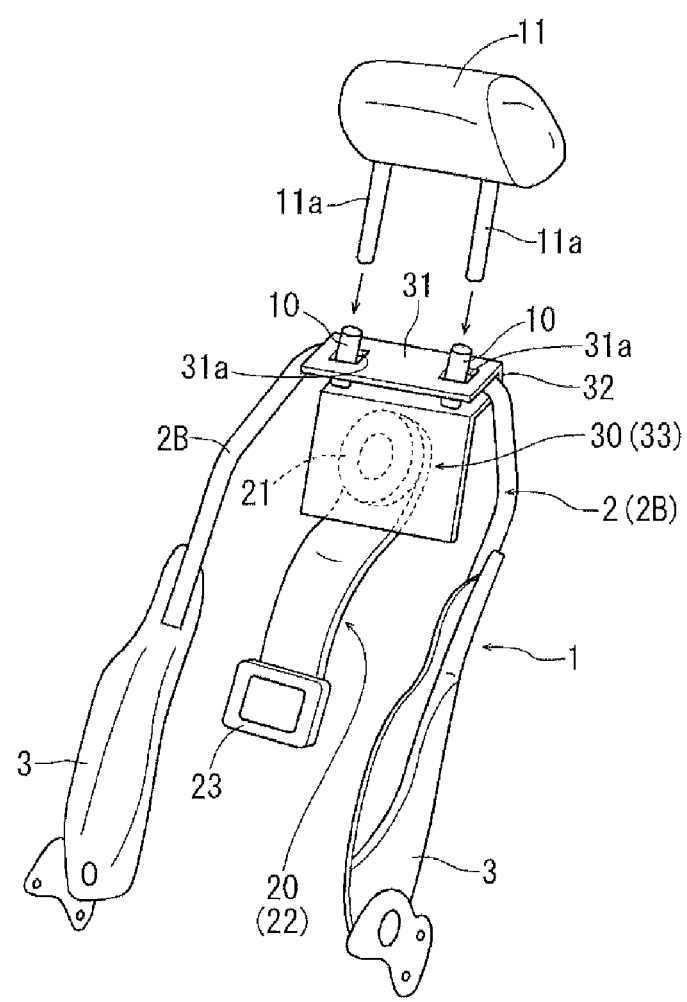
FIG. 2 is a perspective view showing a state in which assembling is complete from the state of FIG. 1.
Figure 3:
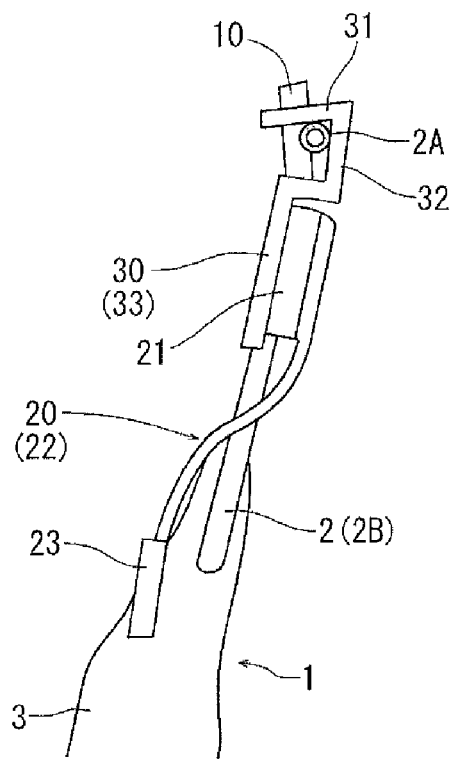
FIG. 3 is a partial sectional side view of FIG. 2.
Figure 4:
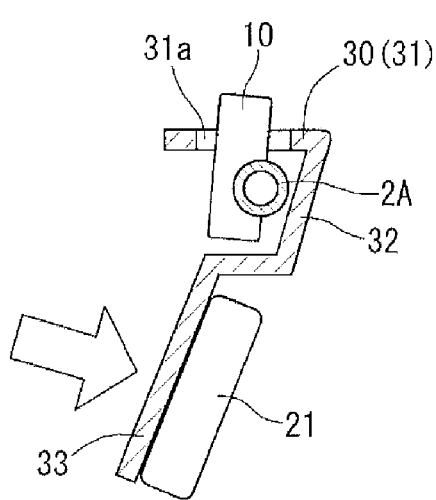
FIG. 4 is a major-part side view showing a state of attachment by means of an attaching member in a normal state.

FIGS. 1-5 show a first embodiment of the present invention. In FIGS. 1 and 2, reference character 1 denotes a frame of a seatback. The frame 1 comprises an upper frame 2 which is made of a round pipe, for example, and formed in an inverse-U shape, and a pair of right-and-left lower frames 3 which are made of a plate metal and formed by pressing.

The upper frame 2 comprises an upper frame 2A which extends in a width direction of a vehicle and a pair of right-and-left side frames 2B which extend downward from end portions, in the width direction of the vehicle, of the upper frame 2A. The lower frames 3 are integrated with respective lower portions of the side frames 2B at their upper portions. Lower end portions of the lower frames 3 are rotatably connected to a seat frame, not illustrated, such that an inclination (reclining) angle, in a longitudinal direction, of the frame 1 (seatback) is adjustable.

A pair of right-and-left headrest holding members 10, which are made of a pipe and extend vertically, respectively, are fixed to the upper frame 2A. As shown in FIG. 2, a headrest 11 includes a pair of right-and-left attachment leg portions 11a which extend downward. The attachment leg portions 11a are inserted into the above-described holding members 10, whereby the headrest 11 is attached to the frame 1.

A ventilation mechanism 20 as a ventilation system is installed to the frame 1. The ventilation mechanism 20 mainly comprises a blower 21, a connection tube portion 22 which extends downward from the blower 21, and a supply-exhaust portion 23 which includes an intake port (or an exhaust port) formed at a lower end portion of the connection tube portion 22.

The blower 21 which is located at the highest level of the ventilation mechanism 20 is arranged at an upper portion of the frame 1, which is positioned below the upper frame 2A (i.e., the headrest 11). The supply-exhaust portion 23 is located at around a middle portion, in a vertical direction, of the frame 1.

The seatback including the frame 1 comprises a cushion material covering over the frame 1 and an outer skin wrapping this cushion material, which are not illustrated, for example, and is provided with a vent port for allowing ventilation air to flow therethrough at least at a position corresponding to the supply-exhaust portion 22. This supply-exhaust portion 22 can be formed by an appropriate method, such as by forming many very-small holes or using a breathable cushion material. By driving the blower with an electricity supply, the ventilation air flows through the vent port of the supply-exhaust portion 22 (ventilation for the back portion of the passenger leaning on the seatback).

The blower 21 is supported at the frame 1 via the attaching member 30. The attaching member 30 is formed by processing a thin synesthetic-resin plate, for example. The attaching member 30 mainly comprises an attaching plate portion 31, a connection portion 32, and a lower extension portion 33. The attaching plate portion 31 has right-and-left two fitting holes 31a, and the headrest holding members 10 are fitted into these fitting holes 31a from above so as to be held thereat.

The connection portion 32 is configured in a curve shape such that it extends downward from a rear end of the attaching plate portion 31 shortly first, and then bends forward shortly. The lower extension portion 33 extends downward from the connection portion 32 and has a back face, to which the blower 21 is fixed by screws or the like.

Figure 5:
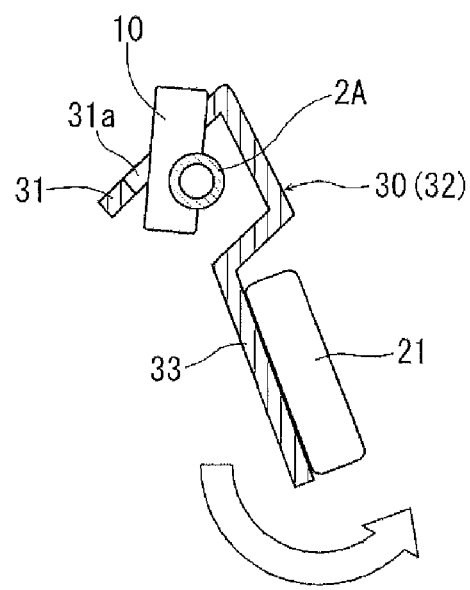
FIG. 5 is a major-part side view showing a state in which the attaching member swings rearward in a vehicle rear collision.

The fitting hole 31a of the attaching plate member 31 has a hole diameter which is sufficiently larger than an outer diameter of the holding member 10. Accordingly, when the blower 21 (the lower extension portion 33) receives a large rearward-load, the attaching member 30 swings rearward around the holding member 10 (i.e., the upper frame 2A) as shown in FIG. 5. That is, when the attaching member 30 swings rearward, a lower portion of the attaching member 30 moves more greatly compared to an upper portion of the attaching member 30.

In the above-described structure, a large load acts on the lower extension portion 33 (i.e., the blower 21) from the passenger (the back of the passenger) in a vehicle rear collision, so that the attaching member 30 swings rearward around the holding member 10. That is, the lower portion of the blower 21 moves rearward more greatly compared to the upper portion of the blower 21. Thereby, the back portion of the passenger moves rearward greatly, so that the passenger's head portion can be supported at the headrest 11 in a state in which a longitudinal-relative position between the head portion and the back of the passenger is properly close. Accordingly, the proper passenger's position as a countermeasure against whiplash can be ensured.

Figure 6:
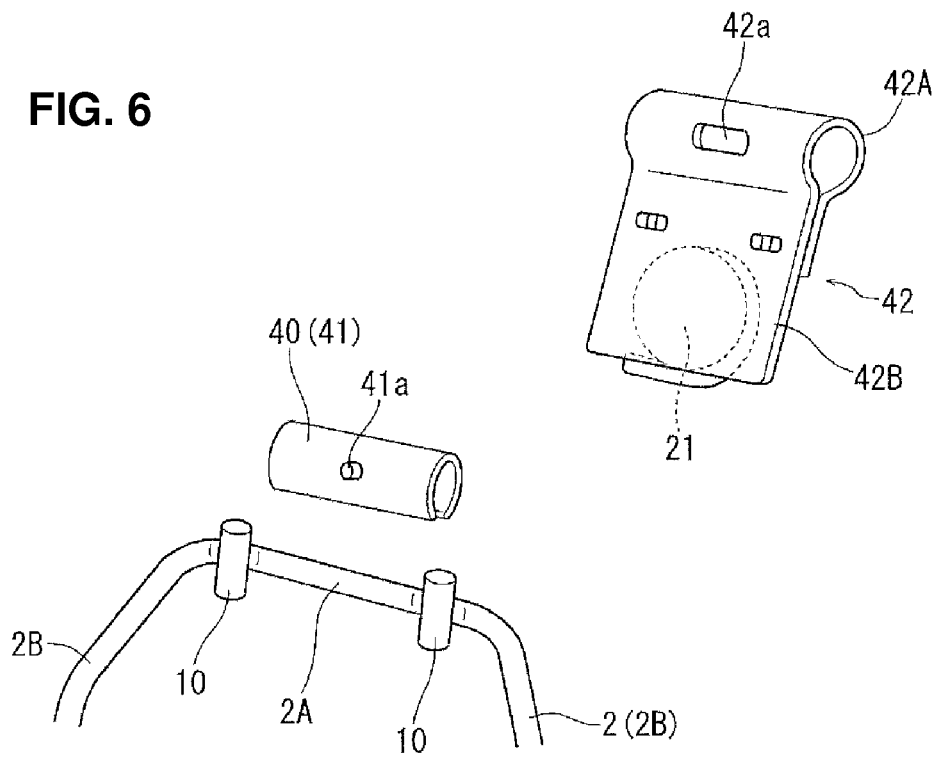
FIG. 6 is an exploded perspective view showing a second embodiment of the present invention, which corresponds to FIG. 1.
Figure 7:
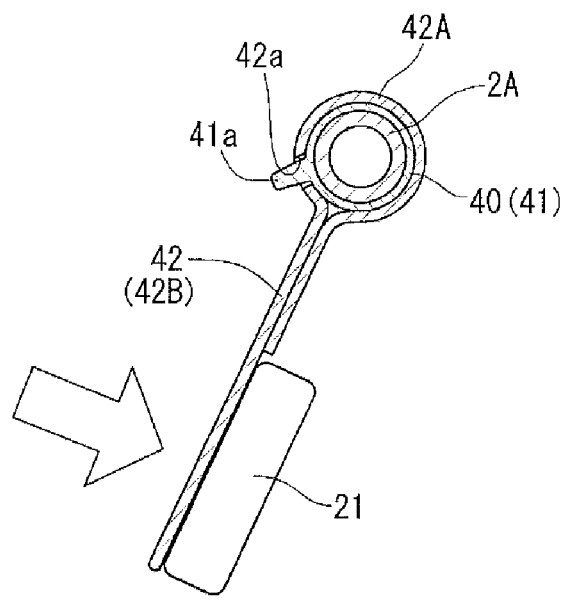
FIG. 7 is a major-part side sectional view showing a state in which assembling is complete after the state of FIG. 6.
Figure 8:
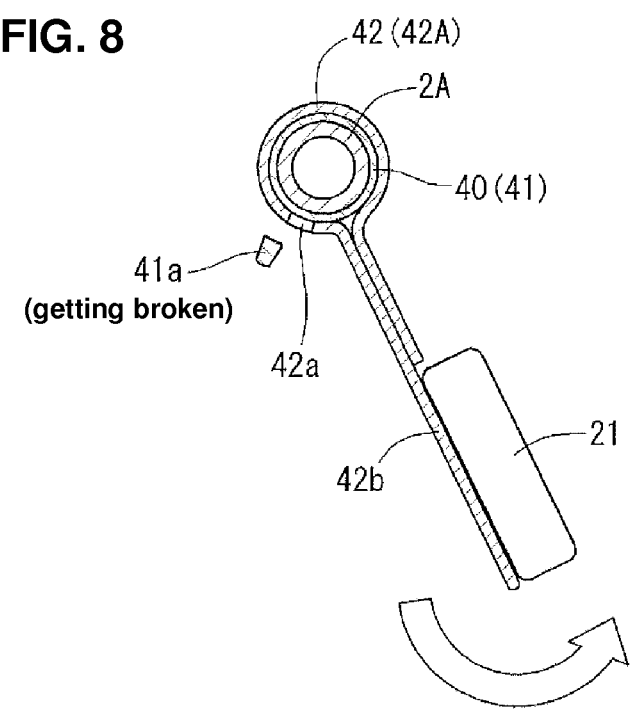
FIG. 8 is a major-part side sectional view showing a state of deformation in the vehicle rear collision after the state of FIG. 6.

FIGS. 6-8 show a second embodiment of the present invention, and the same structural elements as the above-described embodiment are denoted by the same reference characters, duplicated descriptions of which are omitted (similarly to a third embodiment which will be described later). In the second embodiment, an attaching member 40 is used in place of the attaching member 30 of the above-described embodiment.

The attaching member 40 of the present embodiment comprises two members, a first member 41 and a second member 42, which are made from synthetic resin, for example. The first member 41, which has a cylindrical cross section with a partially cut-out periphery, is firmly fitted (adhered, for example) to the upper frame 2A. The first member 41 has a protrusion portion 41a which protrudes outward in a radial direction.

The second member 42 comprises a fitting portion 42A which is of a roughly tubular shape and fitted to an outer periphery of the first member 41, and a lower extension portion 42B which extends downward from the fitting portion 42A. The fitting portion 42A is configured to rotate relatively to the first member 41 when receiving a slightly-large rotational force in its peripheral direction. Further, the fitting portion 42A has a fitting hole (opening) 42a, into which the protrusion portion 41a of the first member 41 is inserted. Herein, the blower 21 is fixed to a rear face of the lower extension portion 42B by screws or the like.

As shown in FIG. 7, a state in which the protrusion portion 41a is inserted into the fitting hole 42a is maintained in a normal state. When the vehicle rear collision occurs, the lower extension portion 42B (i.e., the blower 21) of the second member 42 receives the large rearward-load from the passenger (the back of the passenger). As shown in FIG. 8, the protrusion portion 41a of the first member 41 gets broken, so that the first member 41 swings rearward (the lower portion of the blower 21 moves more greatly compared to the upper portion of the blower 21).

Figure 9:
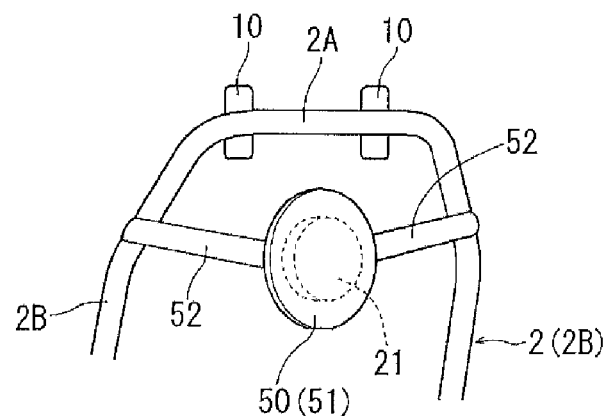
FIG. 9 is a major-part view showing a third embodiment of the present invention.

FIG. 9 shows a third embodiment of the present invention. In the present embodiment, an attaching member 50, which corresponds to the attaching members 30, 40, comprises a holding plate 51 which is made from the synthetic resin, for example, and a pair of right-and-left connecting plates 52 which connect the holding plate 51 to the pair of right-and-left side frames 2B. The connecting plate 52 is made from the synthetic resin, for example, and is configured to be sufficiently resiliently deformable in the longitudinal direction. The blower 21 is fixed to a front face of the holding plate 51 by screws or the like. Herein, the blower 21 may be alternatively attached to a back face of the holding plate 51.

In the present embodiment, the holding plate 51 (i.e., the blower 21) is held at the connecting plate 52 so as to keep its position at a specified position in a normal state. In the vehicle rear collision, when receiving the large rearward-load acting on the blower 21, the connecting plate 52 resiliently deforms greatly, so that the holding plate 51 moves rearward greatly together with the blower 21 as a whole.

Figure 10:
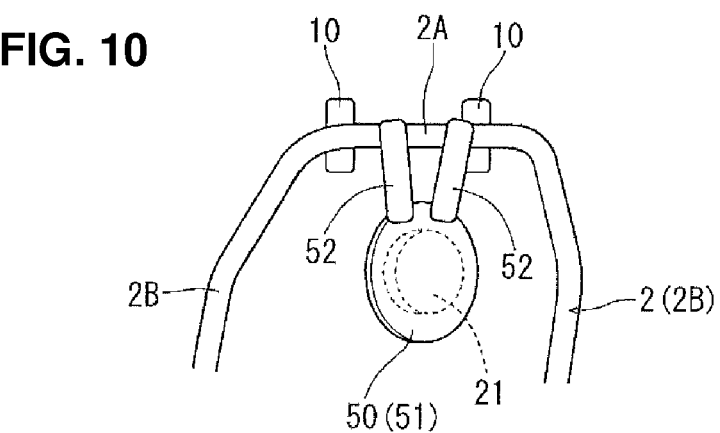
FIG. 10 is a major-part view showing a fourth embodiment of the present invention.

FIG. 10 shows a fourth embodiment of the present invention. The present embodiment is similar to the above-described third embodiment in which an attaching member 50 comprises a holding plate 51 and a pair of right-and-left connecting plates 52. However, the right-and-left connecting plates 52 of the present embodiment extend vertically and connect the holding plate 51 and the upper frames 2A. In the present embodiment, similarly to the first and second embodiments, the holding plate 51 swings rearward around the upper frame 2A (the lower portion of the blower 21 moves more greatly compared to the upper portion of the blower 21).

The present invention should not be limited to the above-described embodiments, and any other modifications or improvements may be applied within the scope of a spirit of the present invention. The blower 21 can be attached to any face of the front and rear faces of the attaching member. However, it may be preferable in interposing the plate-shaped portion between the passenger and the blower 21 that a blower attachment portion of the attaching member be configured to be plate-shaped and the blower 21 be attached to its rear face. Of course, the object of the present invention implicitly includes providing any structure which has been described substantially as a preferable or advantageous one.

What is claimed is:

1. A seat structure of a vehicle provided with a seatback, comprising:
    a frame of the seatback, the frame including an upper frame extending in a vehicle width direction;
    a headrest;
    a pair of right-and-left headrest holding members to hold the headrest, the headrest holding members being fixed to the upper frame of the frame of the seatback:
    an attaching member, an upper end portion of which is rotatably attached around the upper frame at a position between the pair of right-and-left headrest holding members and which comprises a downward extension portion extending downward from the upper end portion:
    a vent portion arranged at a back face of the seatback; and
    a blower to perform ventilation through the vent portion, the blower being attached to the downward extension portion of the attaching member,
    wherein said upper end portion of the attaching member is provided with a restriction portion to restrict relative rotation of the attaching member to said upper frame,
    said blower is configured to be movable rearward relative to the frame of the seatback and the headrest in accordance with rotation of said downward extension portion of the attaching member around the upper frame when receiving a large rearward-load from a passenger seated in the seat in a vehicle rear collision, and
    wherein said rearward-moving configuration of the blower is achieved by releasing said relative-rotation restriction when the blower receives the large rearward-load from the passenger seating in the seat in the vehicle rear collision.

2. The vehicle structure of the vehicle of claim 1, wherein said restriction portion comprises a pair of parts which are in engagement relation with each other, and said releasing of the relative-rotation restriction of the restriction portion is achieved when said engagement relation of the pair of parts is broken.

3. The seat structure of the vehicle of claim 2, wherein said pair of parts of the restriction portion comprise a hole and a protrusion portion which is configured to be inserted into the hole, either one of which is formed on the side of said downward extension portion of the attaching member and the other of which is formed on the side of said upper frame of the frame of the seatback, and said protrusion portion is configured to be broken when the blower receives the large rearward-load from the passenger seated in the seat in the vehicle rear collision.

* * * * *